United States Patent
O Ruanaidh et al.

(10) Patent No.: US 8,463,015 B2
(45) Date of Patent: Jun. 11, 2013

(54) SYSTEM AND METHOD FOR TRACKING THE MOVEMENT OF BIOLOGICAL MATERIALS

(75) Inventors: Joseph O Ruanaidh, Hamilton, NJ (US); Marcin Swiatek, Montreal (CA); Xudong Li, Somerset, NJ (US); Geert Kalusche, Mannedorf (CH)

(73) Assignee: GE Healthcare Bio-Sciences AB, Uppsala (SE)

( * ) Notice: Subject to any disclaimer, the term of this patent is extended or adjusted under 35 U.S.C. 154(b) by 805 days.

(21) Appl. No.: 12/523,100

(22) PCT Filed: Jan. 30, 2008

(86) PCT No.: PCT/US2008/052377
§ 371 (c)(1),
(2), (4) Date: Jul. 14, 2009

(87) PCT Pub. No.: WO2008/100704
PCT Pub. Date: Aug. 21, 2008

(65) Prior Publication Data
US 2010/0046823 A1 Feb. 25, 2010

Related U.S. Application Data

(60) Provisional application No. 60/889,006, filed on Feb. 9, 2007.

(51) Int. Cl.
*G06K 9/00* (2006.01)
(52) U.S. Cl.
USPC ............................................. 382/133

(58) Field of Classification Search
USPC .................... 342/160, 159, 28; 382/178, 133, 382/100, 129, 103, 264
See application file for complete search history.

(56) References Cited

U.S. PATENT DOCUMENTS

| | | | | |
|---|---|---|---|---|
| 4,817,186 | A * | 3/1989 | Goolsbey et al. | 382/178 |
| 5,107,422 | A * | 4/1992 | Kamentsky et al. | 382/133 |
| 5,987,459 | A * | 11/1999 | Swanson et al. | 1/1 |
| 6,067,409 | A * | 5/2000 | Scepanovic et al. | 716/122 |
| 6,345,104 | B1 * | 2/2002 | Rhoads | 382/100 |
| 6,687,824 | B1 * | 2/2004 | Shin | 713/176 |
| 6,917,884 | B2 | 7/2005 | Sammak et al. | |

(Continued)

OTHER PUBLICATIONS

Jang et al., Active models for tracking moving objects, Pattern Recognition, vol. 33, Issue 7, Jul. 2000, pp. 1135-1146.*

(Continued)

*Primary Examiner* — Gerald J. O'Connor
*Assistant Examiner* — Natalie A Pass

(57) ABSTRACT

This invention provides an automated system and method that allows a user to track the movement of an object, such as at least one cell amongst a plurality of cells as it moves from one point to another over time in order for the user to determine how the at least one cell functions. The user is able to track the movement of the at least one cell and determine if the at least one cell structure has changed, such as the at least one cell experiencing cell division or if two or more cells merge together. This user is able to optimally track the at least one cell to find an approximate location of at least one the cell as it moves in time and distance. Thus, this invention provides the user with a means to track cell movement to study the cell function.

10 Claims, 13 Drawing Sheets

U.S. PATENT DOCUMENTS

| | | | |
|---|---|---|---|
| 6,993,173 B2 * | 1/2006 | Zuzan et al. | 382/129 |
| 2004/0029213 A1 * | 2/2004 | Callahan et al. | 435/40.5 |
| 2005/0031034 A1 * | 2/2005 | Kamaci et al. | 375/240.03 |
| 2006/0092022 A1 * | 5/2006 | Cehelnik | 340/561 |
| 2006/0127881 A1 * | 6/2006 | Wong et al. | 435/4 |
| 2006/0132354 A1 * | 6/2006 | Beard et al. | 342/160 |
| 2008/0112606 A1 * | 5/2008 | Lee et al. | 382/133 |

OTHER PUBLICATIONS

Shen, et al. (2006). Automatic tracking of biological cells and compartments using particle filters and active contours. Chemometrics and Intelligent Laboratory Systems, 82(1-2), 276-282.*

Mombach et al., Phys. Rev. Lett. 76, 3032-3035 (1996).*

Jang, D-S, et al., "Active models for tracking moving objects" Pattern Recognition, 33, 1135-1146, (2000).

Mombach, J., et al., "Single Cell Motion in Aggregates of Embryonic Cells" Physical Review Letters, 76(16), 3032-3035, (1996).

Shen, H., et al., "Automatic tracking of biological cells and compartments using particle filters and active contours" 82, 276-282, (2006).

Khan, Z., et al., "An MCMC-Based Particle Filter for Tracking Multiple Interacting Targets", Apr. 16, 2004, Computer Vision—ECCV 2004; [Lecture Notes in Computer Sciences], Springer-Verlag, Berlin/Heidelberg, pp. 279-290.

Li, K., et al., "Online Tracking of Migrating and Proliferating Cells Imaged with Phase-Contrast Microscopy", Computer Vision and Pattern Recognition Workshop, 2006 Conference in New York, NY, USA, Jun. 17-22, 2006, Piscataway, NJ, USA, IEEE, pp. 65-72.

Mccall, J., et al., "Facial Action Coding Using Multiple Visual Cues and a Hierarchy of Particle Filters", Computer Vision and Pattern Recognition Workshop, 2006 Conference in New York, NY, USA, Jun. 17-22, 2006, Piscataway, NJ, USA, IEEE, pp. 150-155.

Shen, H., et al., "Automatic Tracking of Biological Cells and Compartments Using Particle Filters and Active Contours", Chemometrics and Intelligent Laboratory Systems, vol. 82, No. 1-2, May 26, 2006, pp. 276-282.

Tong, G., et al., "A Particle Swarm Optimized Particle Filter for Nonlinear System State Estimator", Evolutionary Computation, 2006, IEEE Congress in Vancouver, BC, Canada, Jul. 16-21, 2006, Piscataway, NJ, USA, pp. 438-442.

Yan, J., et al., "An Effective System for Optical Microscopy Cell Image Segmentation, Tracking and Cell Phase Identification", Image Processing, 2006, IEEE, Oct. 1, 2006, pp. 1917-1920.

EP Extended Search Report issued on co-pending EP application No. 08728494.9 dated Aug. 7, 2012.

* cited by examiner

FIG. 10

|         | Target 1 | Target 2 | Target 3 | Target 4 | Target 5 | Target 6 |
|---------|----------|----------|----------|----------|----------|----------|
| Cloud 1 | 18.2     | 5.1      | 4.6      | 6.3      | 9.2      | 9.4      |
| Cloud 2 | 3.6      | 19.3     | 6.8      | 6.2      | 1.1      | 2.1      |
| Cloud 3 | 7.7      | 3.3      | 2.2      | 9.7      | 15.2     | 14.9     |
| Cloud 4 | 2.2      | 11.7     | 10.3     | 11.9     | 4.1      | 4.5      |
| Cloud 5 | 5.3      | 4.7      | 18.4     | 3.9      | 5.2      | 5.5      |

Select Column Maxima (Split)

|         | Target 1 | Target 2 | Target 3 | Target 4 | Target 5 | Target 6 |
|---------|----------|----------|----------|----------|----------|----------|
| Cloud 1 | X        |          |          |          |          |          |
| Cloud 2 |          | X        |          |          |          |          |
| Cloud 3 |          |          |          |          | X        | X        |
| Cloud 4 |          |          |          | X        |          |          |
| Cloud 5 |          |          | X        |          |          |          |

Select Row Maxima (Birth)

|         | Target 1 | Target 2 | Target 3 | Target 4 | Target 5 | Target 6 |
|---------|----------|----------|----------|----------|----------|----------|
| Cloud 1 | X        |          |          |          |          |          |
| Cloud 2 |          | X        |          |          |          |          |
| Cloud 3 |          |          |          |          | X        |          |
| Cloud 4 |          |          |          | X        |          |          |
| Cloud 5 |          |          | X        |          |          |          |

FIG. 11

|  | Target 1 | Target 2 | Target 3 | Target 4 | Target 5 |
|---|---|---|---|---|---|
| Cloud 1 | 18.2 | 5.1 | 4.6 | 6.3 | 9.2 |
| Cloud 2 | 3.6 | 19.3 | 6.8 | 6.2 | 1.1 |
| Cloud 3 | 7.7 | 3.3 | 2.2 | 9.7 | 15.2 |
| Cloud 4 | 2.2 | 11.7 | 10.3 | 11.9 | 4.1 |
| Cloud 5 | 5.3 | 4.7 | 18.4 | 3.9 | 5.2 |
| Cloud 6 | 5.4 | 3.8 | 5.2 | 4.9 | 7.1 |

Select Row Maxima (Merger)

|  | Target 1 | Target 2 | Target 3 | Target 4 | Target 5 |
|---|---|---|---|---|---|
| Cloud 1 | X | | | | |
| Cloud 2 | | X | | | |
| Cloud 3 | | | | | X |
| Cloud 4 | | | | X | |
| Cloud 5 | | | X | | |
| Cloud 6 | | | | | X |

Select Column Maxima (Cell Death)

|  | Target 1 | Target 2 | Target 3 | Target 4 | Target 5 |
|---|---|---|---|---|---|
| Cloud 1 | X | | | | |
| Cloud 2 | | X | | | |
| Cloud 3 | | | | | X |
| Cloud 4 | | | | X | |
| Cloud 5 | | | X | | |
| Cloud 6 | | | | | |

| Illustration | Name | Object | Lineage |
|---|---|---|---|
| ●——→● | none | The cell retains its label. | Lineage identifier remains unchanged. |
| ○——→● | New | New *cell ID* is issued from the sequence (generator) of Object Labels. | *Lineage ID*, equal to *cell ID* is issued. This originates an new *lineage tree*. |
| ●——→○ | removed | N/A | N/A |
| ●⟨●●  | division | Each daughter cell is issued a new cell ID from the generator of Object Labels | Daughter cells inherit lineage identifier of the mother cell. |
| ●●●→● | collision | New *cell ID* is issued from the sequence (generator) of Object Labels. | If all parent objects belong to the same *lineage tree*, the *lineage ID* is inherited. Otherwise, the new cell will originate a new *lineage tree*, with *Lineage ID* identical to newly assigned *CellID*. . |

SYSTEM AND METHOD FOR TRACKING THE MOVEMENT OF BIOLOGICAL MATERIALS

CROSS-REFERENCE TO RELATED APPLICATIONS

This application is a filing under 35 U.S.C. §371 and claims priority to international patent application number PCT/US2008/052377 filed Jan. 30, 2008, published on Aug. 21, 2008, as WO 2008/100704, which claims priority to U.S. provisional patent application No. 60/889,006 filed Feb. 9, 2007; the disclosure of which is incorporated herein by reference in its entirety.

FIELD OF THE INVENTION

The present invention relates to a system and method for tracking the movement of a biological material.

BACKGROUND OF THE INVENTION

Generally, the way most genes, cells and viruses functions in humans and other organisms is relatively unknown despite the fact that there have been successful genomic sequencing programs and other types of programs. Thus, there is a need for high-throughput screening that enables one to learn and understand gene functions. High-throughput screening makes it possible to review and analyze hundreds of thousands of gene products. The results of these analyses enables one to review the biological processes that takes place within the cell, which is necessary for the analysis of the cells because cell tracking is important to scientific investigation of biological assays.

Typically, one would need to employ a computer in order to track a cell to mark a single cell of a plurality of cells with a dye and track the cell as it moves from one frame to another. This process of tracking the marked cell movement is error-prone and time consuming, because even though the one cell was marked it still may not be distinguishable from the plurality of cells that existed from one frame to another. Also, the dye utilized to mark the cell may hinder the normal cell cycles so one would not obtain a true image of how the cell works as it moves from one frame to another.

There are several different algorithms utilized by a computer for cell tracking, such as a Kalman filter and particle filter. Kalman filter is an efficient recursive filter which estimates the state of a dynamic system from a series of incomplete and noisy measurements. The Kalman filter employs a tracking method based on a second order statistics in order to track the movement of an object, such as a cell from one point to another. Kalman filter employs the tracking method that assumes dynamic and measurement models are linear with Gaussian noise. However, for cellular images sequences, there are many interfering factors, e.g. background clutter and it is difficult to produce a clean image for cellular boundaries, which often causes the collapse of Kalman filter tracking.

Particle filters which is a form of a Sequential Monte Carlo method is sophisticated model estimation techniques based on random sampling. The particle filter does not require the assumption of a Gaussian distribution and the dynamic and measurement models may also be nonlinear. Particle Filters suffer from none of the disadvantages of the Kalman Filter. However there is a penalty to be paid in loss of speed. However, that being said, particle filters are not slow. In terms of speed, using a Particle Filter instead of a Kalman Filter is equivalent to changing from going extremely fast to being just fast enough for most applications.

The fundamental difference between particle filters and Kalman Filters is in how they represent state. The Kalman Filter stores one value for each of the parameters and stores the corresponding variances and correlations between each parameter in the form of a covariance matrix. Particle Filters maintain a collection of "particles", each corresponding to a pair comprising the state vector and its corresponding weight. The overall behavior of the object being tracked can be derived from the statistics of the collection of particles. A single object may be tracked using dozens, hundreds or even thousands of particles. Particle filters require that a cell has a particular shape in order to keep track of it, but a cell is not an object that has one particular shape so it is sometimes difficult to track the cell.

Therefore, there is a need for a system and method for the automated tracking of cells that will be able to produce results that would depict a true image of cell movements in order to study cell function.

SUMMARY OF THE INVENTION

The present invention has been accomplished in view of the above-mentioned technical background, and it is an objective of the present invention to provide a system and method for tracking the movement of a cell.

In a preferred embodiment of the invention, a method for tracking a cell is disclosed. The method includes: providing an image of at least one cell in a previous frame with a location; determining a new location of the at least one cell in a current frame over a period of time based on the location of the at least one cell in the previous frame; measuring the new location of the at least one cell in the current frame; and updating the location of the at least one cell in the current frame based on the measured new location of the at least one cell in the current frame.

In another preferred embodiment of the invention, a method for tracking a cell is disclosed. This method includes: receiving an image of at least one cell in a previous frame; providing a plurality of particles associated with the image of the at least one cell in the previous frame, wherein the plurality of particles track a movement of the at least one cell from a previous frame to at least one cell in a current frame; and determining an approximate location of the at least one cell at the current frame with a plurality of particles in relation to the at least one cell in the previous frame with the plurality of particles.

In yet another preferred embodiment of the invention, a system for tracking a cell is disclosed. An imaging system is configured to receive an image of at least one cell in a previous frame, wherein the imaging system is connected to an image receiving device. The image receiving device is configured to: receive the image of at least one cell in the previous frame; provide a plurality of particles associated with the image of the at least one cell in the previous frame, wherein the plurality of particles track a movement of at least one cell from the current frame to the at least one cell in the previous frame; and determine an approximate location of the at least one cell at the current frame with a plurality of particles in relation to the at least one cell in the previous frame with the plurality of particles.

BRIEF DESCRIPTION OF THE DRAWINGS

These and other advantages of the present invention will become more apparent as the following description is read in conjunction with the accompanying drawings, wherein:

FIG. 10 is a graphical representation of a table depicting the use of generic [inverse] distances to determine a cell merger or cell death in accordance with the invention; and FIG. 11 is a graphical representation of a table depicting the use of generic [inverse] distances to determine a cell split or cell birth in accordance with the invention.

FIG. 12 is a graphical representation of a table showing rules for assignment of labels to daughter objects based on events that occurred between the current frame and its predecessor.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
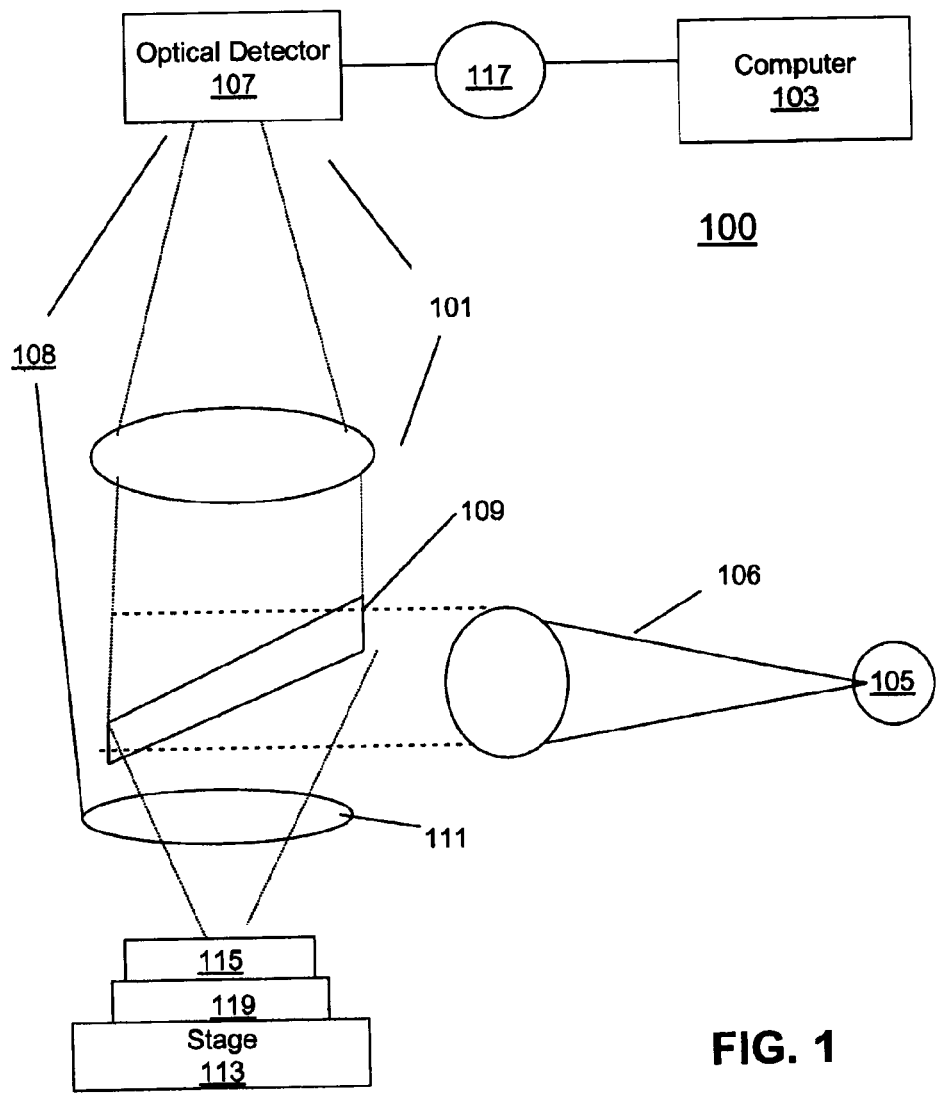
FIG. 1 is a block diagram of a system for tracking cell movement in accordance with an embodiment of the invention.

FIG. 1 illustrates a block diagram of a conventional fluorescent microscope system that includes a system for tracking cell movement. This automated microscope system 100 includes: an optional conventional computer 103, a light source 105, an optical detector 107, a dichroic mirror 109, an objective lens 111, an object stage 113, a sample 115, and a sample holder 119.

Below, the objective lens 111 is the sample specimen holder 119, which may be referred to as a typical micro titer plate, a microscope slide, a chip, a plate of glass, Petri dish, plastic, or silicon or any type of typical holder utilized to hold the sample 115 placed on the object positioning stage 113. There may also be two or more sample holders 119 and/or two or more object stages 113 utilized in this invention.

In another embodiment, the microscope system 100 may be electrically or wirelessly connected by a communication link 117 to the conventional computer 103. The communication link 117 may be any network that is able to facilitate the transfer of data between the automated microscope system 101 and the computer 103, such as a local access network (LAN), a wireless local network, a wide area network (WAN), a universal service bus (USB), an Ethernet link, fiber-optic or the like. The microscope may also have a plurality of objective lenses 111.

The microscope system 100 may be referred to as an image transmitting device, imaging device or imaging system that is capable of capturing an image, by utilizing the optical detector 107 or a typical microscope eyepiece, of the sample 115 or any type of object that is placed on the object stage 113. Also, the microscope system 100 may also be, for example, the INCELL™ Analyzer 1000 or 3000 manufactured by GE Healthcare located in Piscataway, N.J. The sample 115 may be live biological organisms, biological cells, non-biological samples, or the like. The microscope system 100 may be a typical confocal microscope, fluorescent microscope, epifluorescent microscope, phase contrast microscope, differential interference contrast microscope, or any type of microscope known to those of ordinary skill in the art. In another embodiment, the microscope system 100 may be a typical high throughput and high content sub cellular imaging analysis device that is able to rapidly detect, analyze and provide images of biological organisms or the like. Also, the microscope system 100 may be an automated cellular and subcellular imaging system.

The light source 105 may be a lamp, a laser, a plurality of lasers, a light emitting diode (LED), a plurality of LEDs or any type of light source known to those of ordinary skill in the art that generates a light beam 106 that is directed via the main optical path 106, to the object stage 113 to illuminate the sample 115. For a laser scanning microscope the scanning mirror 109 is located above the sample 115; this scanning mirror 109 scans the light from the light source 105 across the field of view of the microscope, to obtain an image of the sample on the optical detector 107. For the fluorescent microscope, the scanning mirror 109 may also be referred to as a dichroic mirror 109, which reflects the excitation light to the sample and passes the fluorescent light from the sample to the optical detector 107.

The optical detector 107 that receives the reflected or fluorescent light from the sample may be a photomultiplier tube, a charged coupled device (CCD), a complementary metal-oxide semiconductor (CMOS) image detector or any optical detector utilized by those of ordinary skill in the art. Optical detector 107 is electrically or wirelessly connected by the communication link 117 to the computer 103. In another embodiment, the optical detector 107 may be replaced with the typical microscope eyepiece or oculars that work with objective lens 111 to further magnify intermediate image so that specimen details can be observed.

The computer 103 may be referred to as an image receiving device 103 or image detection device 103. In another embodiment of the invention, image receiving device 103 may be located inside of the image transmitting device 100. The image receiving device 103 acts as a typical computer, which is capable of receiving an image of the sample 115 from the optical detector 107, then the image receiving device 103 is able to display, save or process the image by utilizing a standard image processing software program, algorithm or equation. Also, the computer 103 may be a personal digital assistant (PDA), laptop computer, notebook computer, mobile telephone, hard-drive based device or any device that can receive, send and store information through the communication link 117. Although, one computer is utilized in this invention a plurality of computers may be utilized in place of computer 103.

Figure 2:
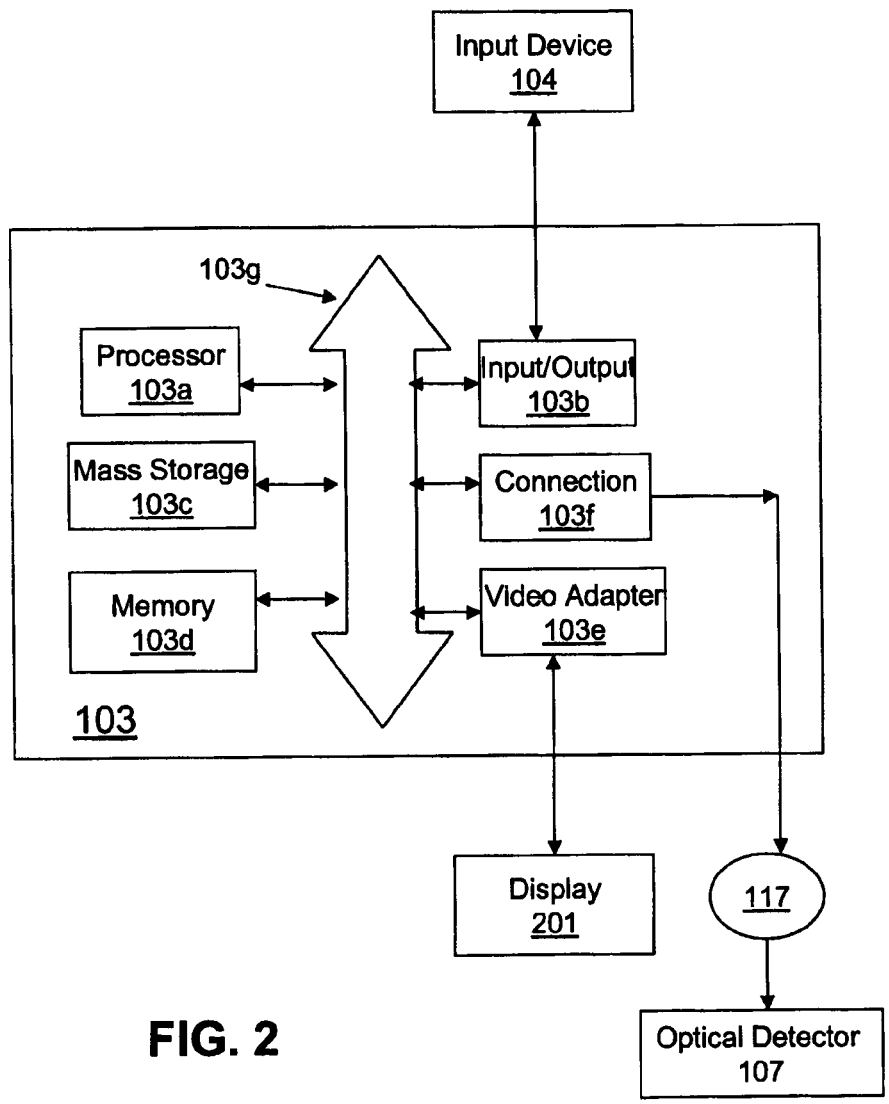
FIG. 2 is a schematic diagram of an image receiving device of FIG. 1 in accordance with the invention.

FIG. 2 illustrates a schematic diagram of the image receiving device of the cell tracking system of FIG. 1. Image or imaging receiving device 103 includes the typical components associated with a conventional computer. Image receiving device 103 may also be stored on the image transmitting system 100. The image receiving device 103 includes: a processor 103a, an input/output (I/O) controller 103b, a mass storage 103c, a memory 103d, a video adapter 103e, a connection interface 103f and a system bus 103g that operatively, electrically or wirelessly, couples the aforementioned systems components to the processor 103a. Also, the system bus 103g, electrically or wirelessly, operatively couples typical computer system components to the processor 103a. The processor 103a may be referred to as a processing unit, a central processing unit (CPU), a plurality of processing units or a parallel processing unit. System bus 103g may be a typical bus associated with a conventional computer. Memory 103d includes a read only memory (ROM) and a random access memory (RAM). ROM includes a typical input/output system including basic routines, which assists in transferring information between components of the computer during start-up.

Input/output controller 103b is connected to the processor 103a by the bus 103g, where the input/output controller 103b acts as an interface that allows a user to enter commands and information into the computer through the cell tracking graphical user interface (GUI) and input device 104, such as a keyboard and pointing devices. The typical pointing devices utilized are joysticks, mouse, game pads or the like. A display 201 is electrically or wirelessly connected to the system bus 103g by the video adapter 103e. Display 201 may be the typical computer monitor, plasma television, liquid crystal display (LCD) or any device capable of displaying characters and/or still images generated by a computer 103. Next to the video adapter 103e of the computer 103, is the connection interface 103f. The connection interface 103f may be referred to as a network interface which is connected, as described above, by the communication link 117 to the optical detector 107. Also, the image receiving device 103 may include a network adapter or a modem, which enables the image receiving device 103 to be coupled to other computers.

Above the memory 103d is the mass storage 103c, which includes: 1. a hard disk drive component (not shown) for reading from and writing to a hard disk and a hard disk drive interface (not shown), 2. a magnetic disk drive (not shown) and a hard disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 103. Also, the aforementioned drives include the technical effect of having an algorithm for tracking cell movement, software or equation of this invention, which will be described in the flow chart of FIGS. 3, 7 and 8.

The software has a cell tracking graphical user interface (GUI). The cell tracking graphical user interface is a specially programmed GUI that has some of the same functionality as a typical GUI, which is a software program designed to allow a computer user to interact easily with the computer 103. The cell tracking GUI includes a screenshot that displays: 1. characteristics of a cell ("measures") as discussed in FIGS. 6A, 6B and 6C.

Figure 3:
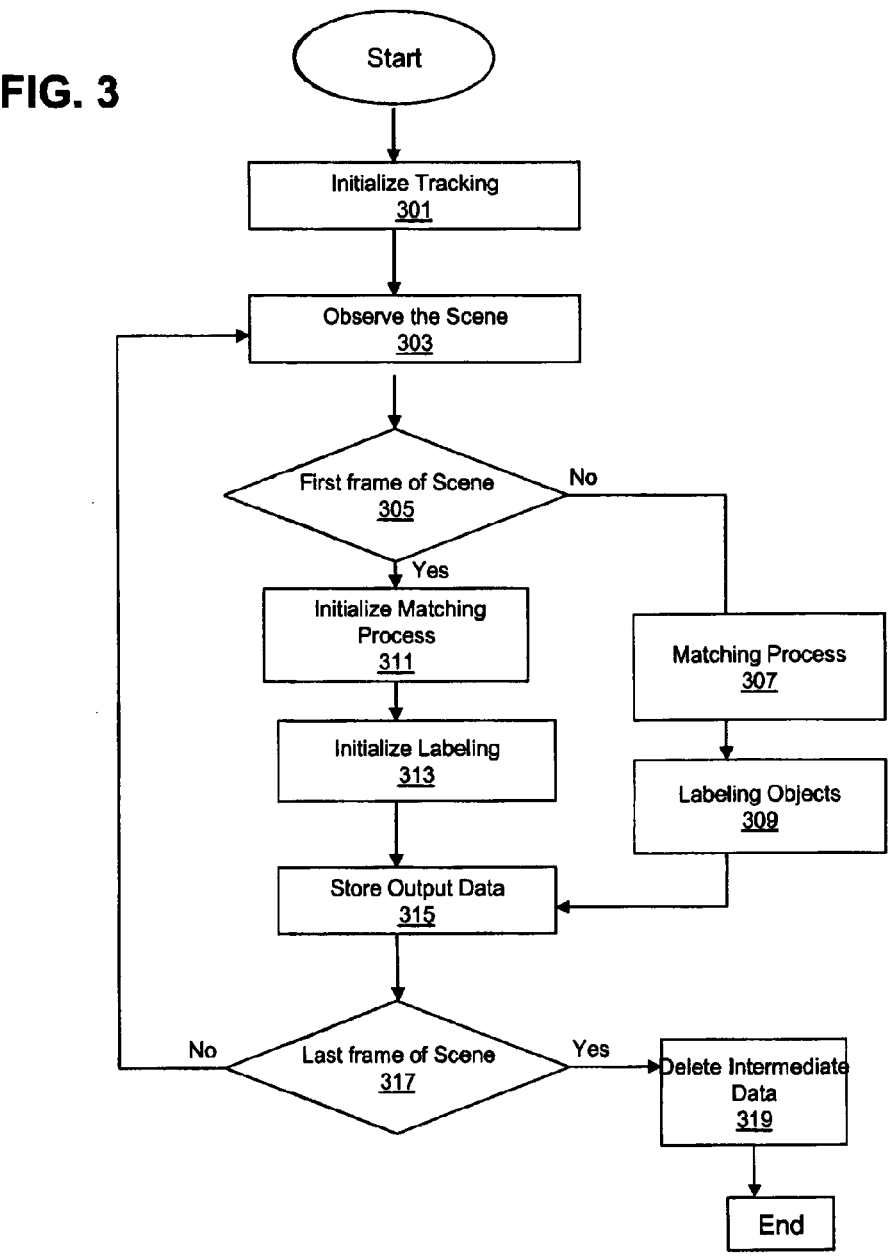
FIG. 3 is a flow-chart that depicts how the cell tracking system of FIG. 1 is utilized in accordance with the invention.

FIG. 3 depicts a flow-chart of how cell movement is tracked in a cell tracking software application. This description is in reference to one cell, but this description also applies to a plurality of cells being tracked by the microscope system 100. A user inserts the plurality of cells into the microscope system 100 that is viewed by the imaging receiving system 103.

Figure 4:
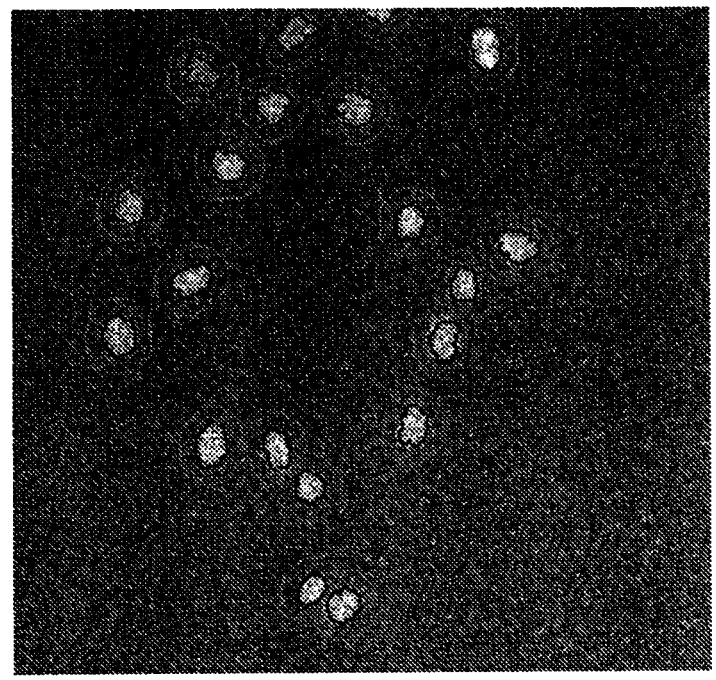
FIG. 4 illustrates a computer screen shot of a generation of a Field of View of a plurality of cells in accordance with the invention.
Figure 6A:
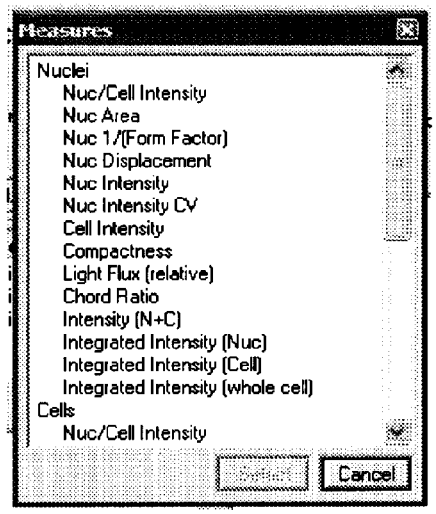
FIG. 6A illustrates a computer screen shot of characteristics associated with the Field of View of the plurality of cells of FIG. 4 in accordance with the invention
Figure 6B:
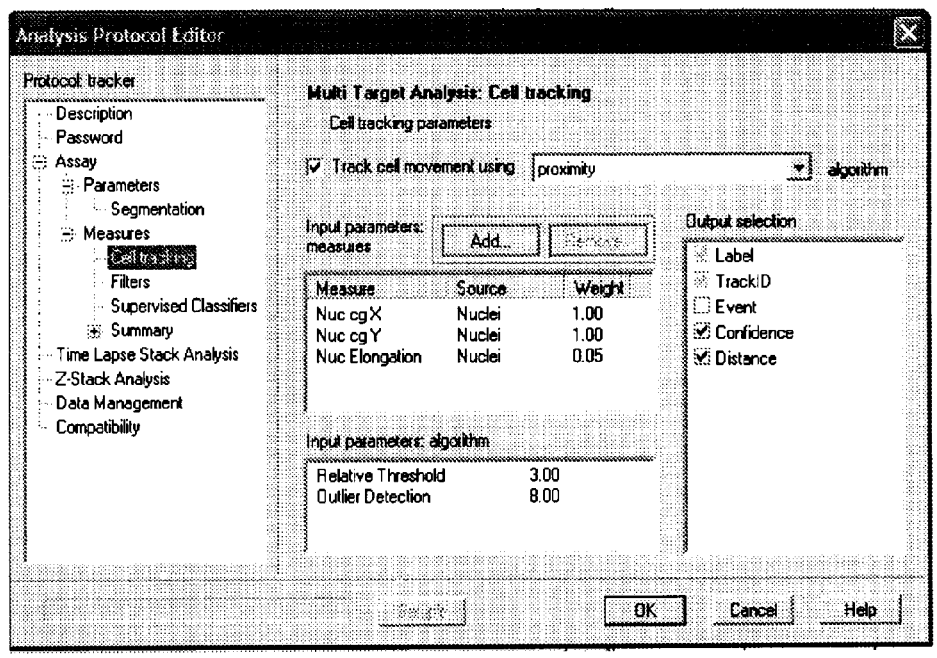
FIG. 6B illustrates a computer screen shot of the characteristics selected in relation to the cell in accordance with the invention.

At block 301, a user employs the pointing device 104 to initiate the cell tracking proximity or particle filter algorithm stored in a protocol on processor 103a, whereby the user manipulates the cell tracking GUI to check off the track cell movement using indicator on the computer screen shot of FIG. 6B to choose the proximity or particle filter algorithm. Next, at block 303 the user at the microscope system 100 observes a Field of View (FOV) of the plurality of cells, known as a "Scene", in a particular state or frame also known as a "previous frame" at the image receiving device 103 as shown in the computer screen shot of FIG. 4. Optionally, the cell tracking graphical user interface may display the characteristics of the cell on a computer screen shot. Referring to FIG. 6A, the computer screen shot illustrates the characteristics of the cell. For each of the cells on the microscope system 100, characteristics of each cell are known based on the standard image analysis software used in the INCELL™ Analysis Workstation or INCELL™ Developer manufactured by GE Healthcare in Piscataway, N.J.

The characteristics of the cell include the intensity of the Nuclei of the cell or the compactness of the Nuclei of the cell or Nuclei area of the cell etc. These characteristics denote the center of the nucleus is mandatory. There are a large number of characteristics of cells that can be shown, which is known to those of ordinary skill in the art so they will not be fully disclosed here. Each of the characteristics are assigned a weight as shown in the computer screen shot of FIG. 6C, where weight describes each character's influence over the tracking process that is expressed as a number greater than 0 and lesser or equal to 1.

At this point, the user can also assign a particular weight for all of the characteristics associated with the cell. For example, for the characteristic of Nuc cg X the user can request a weight of 1.00 and for Nuc cg Y the user can request a weight of 1.00. Nuc cg X and Nuc cg Y are, respectively, X and Y are coordinates of nuclei's centroid. The Nuclei's centroid is equivalent to a Nucleus "center of gravity." The Nucleus cell is represented by M pixels located at: $x_i 1 <= i <= M$, $y_i 1 <= i <= M$ Nuc cg=−x 1/M ME i=1 $x_i$ and Nucg=−y=1/M MΣi=1 $y_i$. Also, the user can choose what output data he wants to receive after the cell tracking process is completed at block 315, such as a Label, Track ID, Event, Confidence and Distance as shown in the computer screen shot of FIG. 6C. Label is a unique label assigned to a cell, which is not the cell's representation at a given time point but the actual physical entity. Track ID is a number expressing parent-child relationship, which generally all imaged progeny of a cell should share its TrackID. Event is related to a given cell at a given time point, such as none, new, division or collision. Confidence is an algorithm provided confidence that the assignment of a given cell at this time point of the current frame to its parent in the previous time point is correct. Distance is the distance traveled by the cell from the previous frame to the present frame.

The cell tracking software program includes the standard segmentation and quantification program that enables it to segment and quantify the plurality of cells in order to detect and analyze at least one cell from the image of the plurality of cells and calculate the characteristics of the at least one cell, i.e. feature vectors, cell position, area, intensity, ratios, classifications, etc. The "ratio" might be an example of an invariant feature—one which maintains its value even if an object changes size but doesn't change its shape. Classification results are yet more features. For example, cells go through stages in their life cycle and these stages can be determined by a classifier. Depending on the stage in the life cycle we might even employ different sets of features. For example, just prior to cell division cells grow in size and brightness and become elongated. All three features, particularly elongation or "form factor", aid in identifying the same cell in the next frame. The user is able to utilize the pointing device 104 (FIG. 2) to manipulate the cell tracking graphical user interface (GUI) of the computer 103 to choose at least one cell from the plurality of cells.

Figure 5:
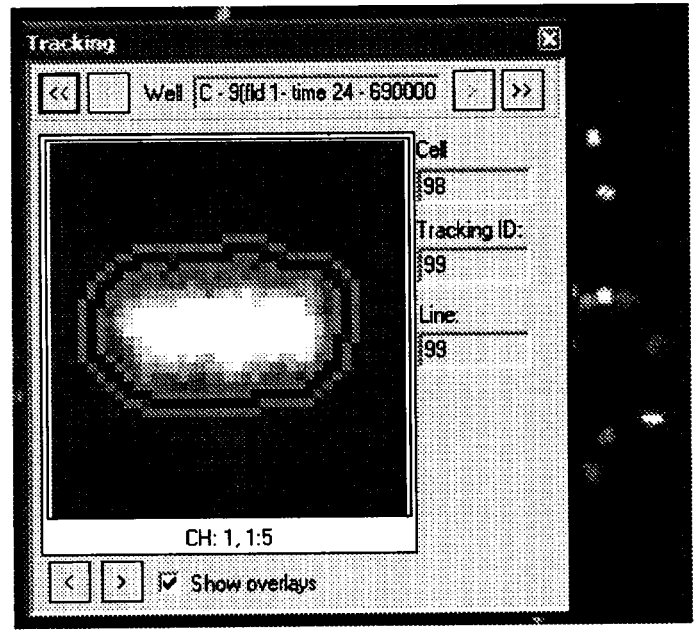
FIG. 5 illustrates a computer screen shot of a generation of a Field of View of one cell from a plurality cells that shows characteristics of the cell in accordance with the invention.

Referring to FIG. 5, after the plurality of cells undergoes the quantification and segmentation process, then the cell that is chosen by the user to track over a period of time is shown in a computer screen shot where the cell is magnified and the cell tracking GUI shows buttons allowing for navigation between time points "<<" and ">>" and between sibling cells within the same frame "<" and ">". Also, this computer screen shot of the cell includes a tracking id 99 to track the cell as well as cell number 98 to differentiate this cell from the other cells shown in FIG. 4.

At block 305, the processor 103a in the image receiving system 103 determines if it is the first frame or previous frame in the Field of View (FOV) of the image receiving system 103 that is being viewed. If the first frame is not the first frame or the previous frame then the matching frame process takes place at block 307.

Figure 6C:
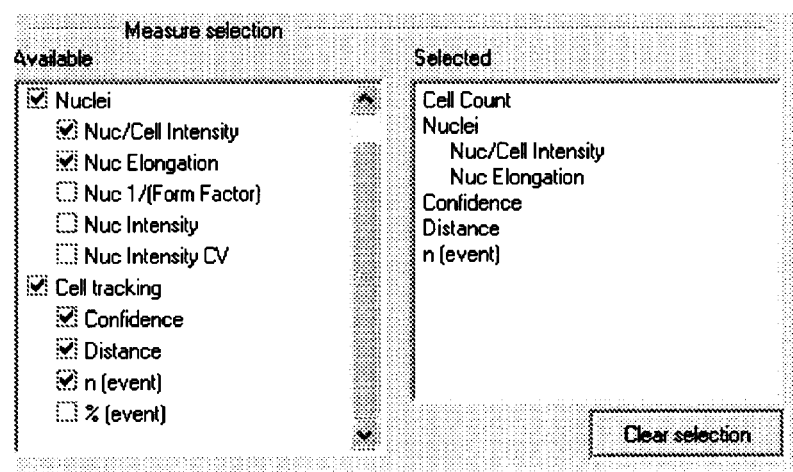
FIG. 6C illustrates a computer screen shot of the input characteristics being selected in accordance with the invention.

At block 307, the user is able to employ the image receiving device 103 to manipulate the cell tracking GUI to predict a cell change from where the at least one cell was observed in the present or current frame to the previous frame at block 301 over a period of time. As shown in FIG. 6C, the user will be able to track the movement of at least one cell in the plurality of cells in a current frame to the at least one cell in the plurality of cells in the previous frame by using a proximity algorithm at block 701 or a particle filter algorithm at block 801. The proximity algorithm represents the position of the at least one cell in the plurality of cells in the current frame (closest cell) that is equal to the position of the at least one cell in the previous frame. The particle filter algorithm represents the position of the at least one cell in the plurality of cells in the current frame that is equal to the last position or previous frame of the at least one cell in the plurality of cells+ velocity*by time+½ acceleration*by time squared+a random change. This particle filter uses a dynamic model. The purpose of the proximity and particle filter algorithm is to identify events linking the present (current frame) with the past (any earlier processed frame; usually simply the previous one).

Figure 7:
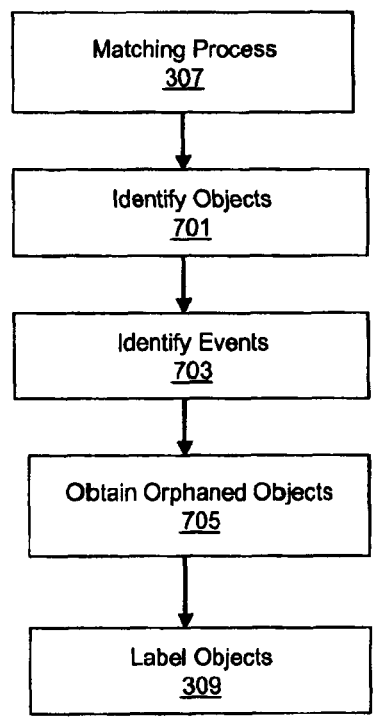
FIG. 7 depicts a flow-chart of the Proximity algorithm in accordance with the invention.

FIG. 7 depicts a flow-chart of how the proximity algorithm is employed to predict where the cell will move from a first location to the next location. At block 701, the cell tracking software has produced a new frame or current frame represented by the letter T containing the same plurality of cells from the previous frame represented by the letter P within a time period of, for example $10^6$ ms to $5 \times 10^9$ ms at a time interval of $10^4$ ms. At this time, for each object in the previous frame being tracked, objects or cells in the current frame that are close enough to the object or cells in the previous frame are considered to be "candidate matches." The current frame T has feature vectors (location) that are represented by the letter t and the previous frame P has feature vectors (location) that are represented by the letter p. A candidate match is either an object closest to the one considered for an object or it is not farther from it than q distances from the considered object to its closest match. A set of candidate matches for a symbol $p_i$ is $M_i$. The distance between the object closest in the current frame to the previous frame is also known as the standard Euclidean distance between the two vectors, where each coordinate is weighted as described above. In order to obtain the distance between the current frame and the previous frame the following equations are applied:

$$m_i = m(p_1) = \min_{t \in T}(\|wp_i, wt\|), p_i \in P \qquad 1.$$

$$M_p \equiv \{p \in P : \|wt_i, wp\| \leq qm_i\} \qquad 2.$$

$$C \equiv \{(p,t,d), p \in P, t \in M_p, d = \|wt, wp\|\} \qquad 3.$$

For the first equation, $m_i$ denotes the distance between the feature vector $p_i$ and a feature vector from T (next frame, which is closest to $p_i$, in the sense of weighted distance). The second equation denotes the set of candidate matches for each vector p from P to contain all feature vectors t from T, such that the weighted distance between t and T is lesser or equal to the minimal distance (as defined in eq. 1) multiplied by q. The third equation formally introduces the mapping C between frames P and T, representing information on all matches for the plurality of cells between the previous and the current frame, as a set of triplets that includes: feature p from P, feature vector t from T (drawn from the set Mp of candidate matches for p) and the weighted distance between p and t. C is the set of all tuples comprising p calls in previous frames, t cells that are considered candidate matches for P and d the corresponding distance. The brackets made of two vertical bars do not represent the absolute value of a number. The vertical bars represent the Euclidean norm of a vector, where it is a vector span between points wp and wt.

At block 703 the cell tracking software indicates that the letter D is defined to be a population of weighted distances taken from elements of C (third element of the tuple). All elements m of C, for which distance d(m)>med(D)+ $10h_{out}$·mad(D) are removed from the set as aberrant.

Constant $h_{out}$ is supplied by the user. The term med represents the median of a population. The term mad represents the median of absolute deviations.

Also, at block 703 events, described above, are identified. For example, the events may be collisions or divisions based on a number of entries originating or ending with a particular element from P and T related to their respective feature vectors of p and t. At block 705, objects that are not immediately related to either P or T based on their feature vectors of p and t are orphaned objects or cells that generate departure and arrival events respectively.

Also, at block 705 confidence indicators for each matched record are allocated. The definitions of confidence are arbitrary and do not correspond directly to the matching process, but rather to the input conditions. The various events are allocated according to the equations shown below:

None and collision events: $1-d/s_p$, where $s_p$ is the distance between p and the second closest match from T. 4.

Division: $b_t/s_p$, where $b_t$ is the distance between T and the vector closest to it in P. 5.

Arrival: $1-m_{q \in P}/b_t$ 6.

Departure: $1-m_{q \in P}/m_p$ 7.

For the None and Collision events equation, $s_p$ is the distance between p and the second closest match from T. With respect to the Division equation, $b_t$ is the distance between t and the vector closest to it is P. For the Arrival and Departure event equation, the mean of population D divided by $b_t$ or $m_p$, respectively, is subtracted from the numerical value of 1. At this point, the objects or the at least one cell in the current frame is ready to be labeled by going to block 309.

At block 309, the at least one cell from the current frame or T are labeled based on events enumerated in the preceding process. This labeling step assigns identifiers or names that are expected to remain constant through objects' lifetime and which could be used to denote images of the physical objects. The identifiers will enable the program to present output data in a way that allows the user to grasp these relationships. These labels are natural numbers that are taken from a sequence starting at 1 with the first frame of a scene, where each scene is labeled independently. Also, this labeling process identifies lineage trees that are cell descendants from the same cell or from the previous frame. Similarly to object labels, lineage trees are also identified by natural numbers. The labels are assigned to daughter objects based on events that occurred between the current frame and its predecessor according to the rules of the table of FIG. 12.

Figure 13:
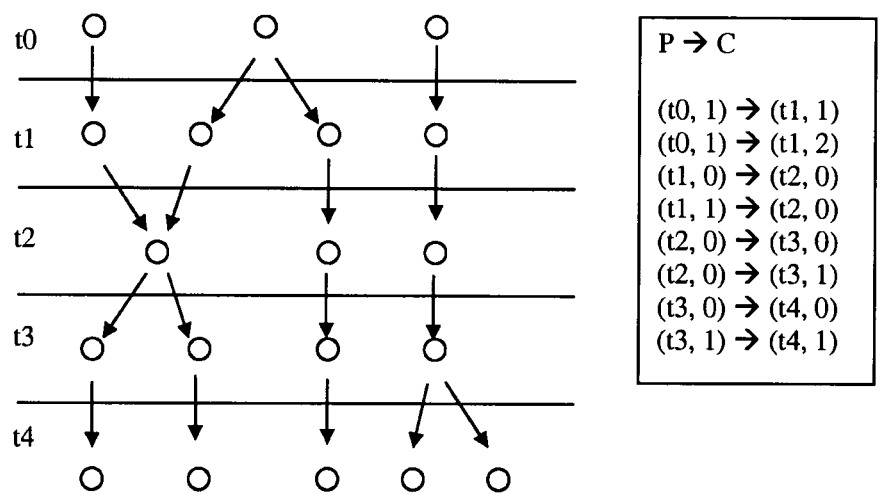
FIG. 13 is a graphical representation of a table that depicts the current frame and previous frame or parent-child relationship in a tabular form.

Next, at block 315 the output data of the current frame from the previous frame is shown over a period of time. This output data is represented as a table shown in FIG. 13. The FIG. 13 table depicts the current frame and previous frame or parent-child relationship in a tabular form. The FIG. 13 table information may also include event labels, cell IDs and parentage tree IDs.

If the frame under consideration is the first frame of a scene, initialization of data structures required by the tracking algorithm occurs at block 311.

Next, at block 313 there is a labeling of the objects that were tracked into various events, described above, such as Collision, Arrival, Departure etc. At block 315, as described above, the output data for the current frame and the previous frame over a period of time are shown. At block 317, there is a determination by the image receiving device 103 if the last frame of the scene has been taken by the image receiving device 103. Essentially, the user informs the image receiving device or checks if there is a protocol on the image receiving device 103 to review a number of current frames in a range of 1 to 100 frames, preferably 60 to 80 frames. For example, 100 current frames over 100,000-1,000,000 ms period of time in order to obtain an accurate description of how the object or cell with a plurality of cells in the Field of View will move over a period of time. If it is determined that the last frame of the scene has not been obtained, then the process returns to block 303. If it is determined that the last frame of the scene has been obtained and output data is obtained, then the process goes to block 319. At block 319, the intermediate data in between the present and previous frames will be deleted and this process will end.

The particle filter algorithm used in this invention includes two separate layers an inner layer and an outer layer. Each component of the inner layer may be considered a sub-tracker whose responsibility is to track an individual target or cell. The outer layer may be considered to be a tracker whose responsibility is to track all targets or cells. The inner layer includes a cloud of "particles", which, like a swarm of bees, pursues a simple target, such as an object or a cell. The outer layer includes a set of clouds each of which is intended to pursue a target. Both the inner layer and the outer layer have the usual predict, observe/measure and update steps. The outer layer has the predict stage that predicts each cloud's whereabouts by delegating prediction to each of its component clouds. In other words, the outer layer does not do the prediction itself; rather the inner layer does its own prediction.

Also, the outer layer has a measurement stage that encompasses 2 steps. First, each cloud for each target a distance is computed from the cloud to each target. The outer layer measurement stage assumes two aspects. First, it assumes that the computer 103 knows how to measure the "distance" between each cloud and each target, which is disclosed later during the discussion of cross entropy. Second aspect is that the computer 103 will know what to do with these distances; such as determine events, None, merging, split, cell birth and cell death. At the end of the measurement stage, the computer 103 should have the same number of particle clouds as targets or cells. Towards this end, the computer 103 needs to determine and distinguish between: 1. cell splitting, 2. cell merging, 3. cell disappearance and 4. cell birth. The criteria for the objective analysis of the table of distances between targets and clouds are shown in FIGS. 10 and 11.

The next step of the outer layer measurement stage includes the computer 103 building a "Responsibility Matrix" (RM) that utilizes distances computed from step 1. Next, the computer 103 analyzes the RM for splits, merges, collisions etc in the cell. Next, the computer 103 determines the output which is equal to a set of particle clouds one for each target.

The outer layer updates stage delegates to each particle cloud to update its own state. The outer layer measurement stage is quite complicated and includes a great deal of novel aspects. The outer layer operates on a whole plurality of targets in an image, where the targets are defined by a separate segmentation algorithm such as those provided by the INCELL™ 1000 Developer Toolbox, manufactured by GE Healthcare in Piscataway, N.J.

Similar to the outer layer, the inner layer is a typical Bayesian tracking filter that includes separate predate, observe, and update stages. The inner layer of the particle filter includes cloud of particles for tracking a simple target. The inner layer predict stage is shown:

Predict:
$$x_t \leftarrow p(x_t | x_{t-1}) \quad \text{Theory}$$
$$\text{DRIFT: } x'(t) = x(t-1) + vx(t-1)$$
$$y'(t) = y(t-1) + vy(t-1) \quad \text{Practice}$$
$$\text{DIFFUSION: } x(t) = x'(t) + ex(t)$$
$$y(t) = y'(t) + ey(t)$$

The above example shows a simple model employing zero acceleration. In general, we could employ a model that computes a new or final location for x and y taking into account three different dynamic models: 1. Final Position=Initial position+Velocity*Time+Noise, 2. Final Position=Initial Position+Noise and 3. Final Position, or 3. Initial Position+Velocity*Time+0.5*Acceleration*Time*Time+Noise.

Figure 9:
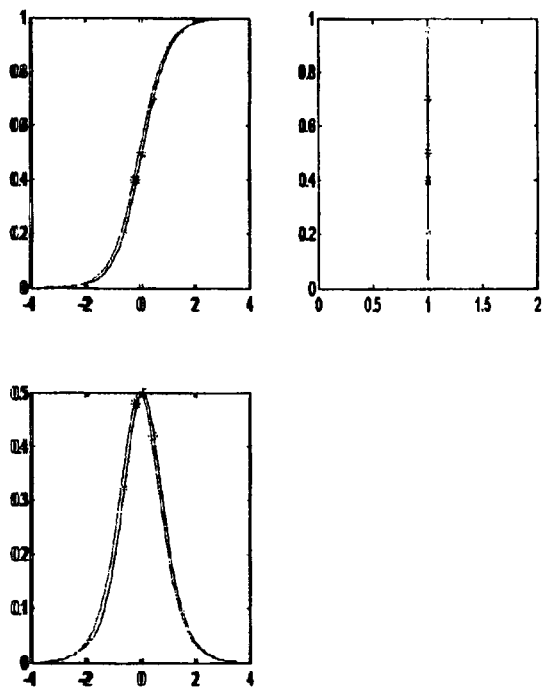
FIG. 9 is a graphical representation of a prescription for generating a Hyperbolic Cauchy Density in accordance with the invention.

The theory aspect of the predict stage states that the computer 103 should draw samples directly from the density $p(x_t|x_{t-1})$, but this is not possible at first. In practice this density is not available to the computer 103. In order to avoid the pitfalls associated with the use of the Kalman Filter, a different density is carefully chosen, which is itself not based on Gaussian statistics. The density of choice is a long tailed density. The utilization of the probability density function affects the robustness of the cell tracker. The principle behind the field of robust statistics is to minimize the effect one or more outliers can have. One way to do this is to base the estimates on thick tailed densities, of which the Hyperbolic Cauchy Density in FIG. 9 is an example. Note that after we have tracked a large number of cells it will be possible to implement the theoretical sampling, which is dictated by the predict stage of the particle filter, namely $x_t \leftarrow p(x_t|x_{t-1})$ as proposed by Isard and Blake in M. Isard and A. Blake, "Condensation—conditional density propagation for visual tracking," International Journal of Computer Vision 29(1), pp. 5-28, 1998.

The graph of the log probability of the Hyperbolic Cauchy density shows an entirely different behavior to the log probability of the Gaussian. For large distances, its behavior is linear rather than parabolic. For small distances the two measurements are almost identical but for large distances the Hyperbolic Cauchy is more forgiving. This is the essence of a robust estimator because outliers get less weight. Heavy tails in the p.d.f. imply less weight given to outliers. This density uses an L2 norm for small errors but uses an L1 norm for large errors.

Gaussian statistics are not robust because the associated distance measure squares the outliers. The net result is a non-linear tracker that is Gaussian for small distances but seamlessly turns non-Gaussian for large samples. This should increase robustness to outliers. The distance between features is implicitly taken care of in that here we are just using a more stable measure of "distance".

H-Cauchy: small x=adding squares
large x=adding absolute values

Importance sampling is the other good reason for using a heavy tailed density. Discussions about Kalman Filters and Particle Filters are in general made overly complicated by the presence of a large number of multidimensional integrals. Particle Filtering may be considered a form of numerical Monte Carlo integration using the method of Importance Sampling. In importance sampling, a good efficient proposal density matches the true statistics as closely as possible. However, for the sake of numerical stability, it is desirable that the proposal density be heavy tailed.

To summarize, heavy tails accomplish three goals:
1. robustness to outliers (i.e. sudden large changes)
2. more ambition in seeking out and in exploring new states
3. more stable numerical integration Next, the inner layer of the particle filter includes a measure component. The theory is a weight equal to $p(z_t|x_{t-1})$. The practice is the same as the theory of the probability density function of the density is available in closed form. In this stage each particle obtains a weight which depends on its proximity to the target as measured by the probability density function.

Lastly, the inner layer includes an update component where samples are re-sampled according to their individual weights. Particles that make good predictions are rewarded by being sample more than once. Samples that make poor predictions will have small weight and will probably not be sampled at all. The update step re-samples the particles, with replacement. This is rather simple to implement as shown by the following Matlab code:

```
function sample = sampleUnif (nsamp, wts)
    csum = cumsum(wts);
    rng = csum(length(csum));
    sample = zeros(nsamp, 1);
    for j=1:nsamp
        choice = rng*rand(1);
        l = find(csum >= choice);
        sample(j) = l(1);
    end
```

The corresponding C code, used in the product, is better written because it uses a binary search based on the fact that the CDF is monotonically increasing and presorted.

Example of Resampling
Input: (9, 0.167) (16, 0.333) (7, 0.000) (20, 0.000) (18, 0.500) (23, 0.000)
Output: (9, 0.167) (16, 0.167) (16, 0.167) (18, 0.167) (18, 0.167) (18, 0.167)

The first number is being sampled and the second number is the corresponding weight, where 9 appear once, 16 appear twice and 18 appear three times in the output. 20, 7, 23 do not appear because they have zero weight. Note that the weights are re-normalized as to add to 1 after re-sampling. In this example, here the values 9, 16, 7, 20, 18, 23 are scalars but there is no reason why they can't be vectors. In general, that is exactly what they are—vectors.

Figure 8:
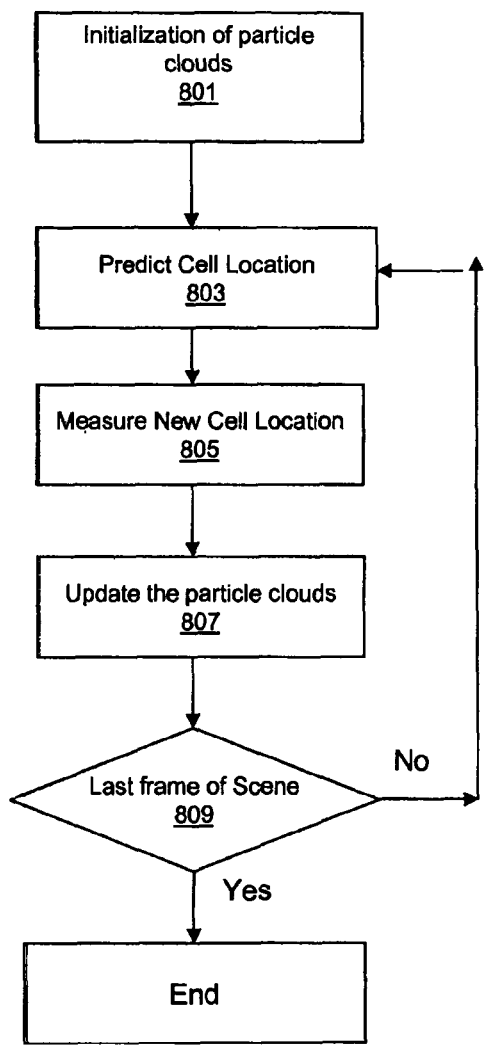
FIG. 8 depicts a flow-chart of the Particle filter algorithm in accordance with the invention.

In FIG. 8, at block 801, the computer initiates the particle filter tracking algorithm giving each target its own tracker. The initial state of the tracker is based on the observable characteristics of the cell, such as the cell position, image intensity, cell area, form factor, or in general other measurable feature vectors, etc. associated with the original location and state of the cell image. At block 803, the particle filter algorithm is able to predict the location of the cell image based on the aforementioned observable characteristics by inferring the value of hidden characteristics, such as velocity, in the same manner as other Bayesian learning algorithms.

This cell tracking software program includes a typical Monte Carlo particle filter program, which enables the user to track the cell image at its original state or location at a previous frame to a new state or location at the current frame, where a plurality of particles from the Monte Carlo program essentially follows the original cell from its starting location to a new location like a swarm of bees within a certain period of time depending on the user. The particle filter may include as many as one hundred "particles" or more that acts as a particle cloud that chases after the assigned target of the new location of the cell.

The cell tracking software program applies a standard probability density function (p.d.f.), such as the Hyperbolic Cauchy Density equation to the clouds of the at least one cell in the current or next frame in order to determine the approximate location of the at least one cell in the current frame from the plurality of cells in the previous frame. This block 803 is also where the algorithm assesses a location of the at least one cell in the current frame. The utilization of the probability density function affects the robustness of the cell tracker. The principle behind the field of robust statistics is to minimize the effect one or more outliers can have. One way to do this is to base the estimates on thick tailed densities, of which the Hyperbolic Cauchy Density is an example of a thick tailed density described above.

Next, at block 805 for the inner layer of the particle filter algorithm where individual targets are tracked the new location of the cell based on the feature vectors, cell intensity, cell position etc. is looked at based on the distance from the original location of the cell image at the previous frame to the new location of the cell image at the current frame or a generic norm based on the log probability of the particle relative to the observed position of a cell in the space of features (not just 2D space but multi-dimensional space where features are defined). This distance may be the typical Euclidean distance ($L_2$ norm) or the Metropolis distance ($L_1$ norm) or some generic distance based on the log probability as described below that provides the weight for each particle necessary for re-sampling in the update stage at block 807, which is r-sampling.

For the outer layer which is the tracker management system at block 805, the computer 103 has to compute the responsibility matrix, described above, which depends on generic measures of distance. It is well known to those skilled in the art that the logarithm of the likelihood function is equivalent to distance. The classic example that is often discussed is that of a Gaussian likelihood function for independent identically distributed data. In this special case, the equivalent distance measurement is the Euclidean norm, and the standard method of least squares is equivalent to maximizing the likelihood function (i.e. distance is equivalent to minus log probability).

We express the total distance between particles that comprise a cloud as minus the sum of log probabilities:

$$d_{jk} = -\sum_{i=1}^{N} \log w_{ijk}$$

where $w_{ijk}$ if the probability density functions of each cell's position in feature space relative to a given particle. (Note that summing the log probabilities is equivalent to multiplying the probabilities, which is appropriate way to compute the overall probability because the particles are statistically independent).

The summation is, in fact, a Monte Carlo integral in disguise. If the particles in the particle cloud are drawn from a density $p(x)$ then we have:

$$d_{jk} = -\sum_{i=1}^{N} \log w_{ijk} \approx -\int p(x) \log w(x) dx$$

The right hand side of this equation is known as the cross entropy.

Further, note that the cross entropy can be decomposed:

$$-\int p(x) \log w(x) dx = \int p(x) \log \frac{p(x)}{w(x)} dx - \int p(x) \log p(x) dx$$

The term in $-\int p(x) \log p(x) dx$ is the self-entropy. Entropy is commonly understood to be a measure of disorder. In this context, it is a measure of how uniform is the density $p(x)$. The re-sampling step (i.e. the "update" step) of the particle filter resets the particle weights to a uniform value thus making each particle equivalent.

The term in $$\int p(x) \log \frac{p(x)}{w(x)} dx$$

is the Kullback Leibler Divergence (KLD). It is commonly used as a measure of distance between probability densities. (Strictly speaking it is not a true measure of distance because it is not symmetric). KLD is at a minimum when $p(x)$ and $w(x)$ are identical. Minimizing our measure of "distance" implicitly minimizes the KLD. Minimum KLD would occur, for example, when the target is sitting squarely in the centre of the particle cloud (so the distribution of the swarm of particles around the target follows the true distribution of the particles with minimal offset). In such circumstances, we could conclude that the particle cloud based tracker is locked onto the target.

In FIG. 10, for the select column maxima cross entropies for five clouds and six targets. Cloud 5 corresponds to both Targets 5 and 6. We infer that there has been a possible split. For FIG. 10, the select row maxima, Target 6 has no matching clouds. The other possible interpretation of the data is that Cloud 5 is tracking Target 5 and that Target 6 is completely new. Less likely is the third scenario where Cloud 5 is tracking Target 6 and Target 5 is new. The way to resolve this conflict is to use the log probabilities in the table to compute the probability of a split and to compare it with the probability of a single cell being tracked, for example by utilizing Bayesian Decision Theory or Bayesian Network Theory to convert these probabilities into corresponding graph structure.

In FIG. 11, for the select row Maxima, the upper half of the above table shows the cross entropies between known targets and existing particle clouds. The lower half shows the row maxima of the cross entropies and where they occur. Cloud 6 has no matching target which means that the targets originally tracked by Clouds 3 and 6 have probably merged.

A decision has to be made as to whether the two targets corresponding to Clouds 3 and 6 merged or, alternatively, the target being tracked by Cloud 6 simply disappeared. The other (much less likely) explanation is that the target tracked by Cloud 3 disappeared and Target 5 is being tracked by Cloud 6. The probability of each possibility can be computed by summing the entries of the joint probability table to obtain the requisite marginal or conditional probabilities. The correct inference may be formally carried out by employing the standard Bayes Theorem. Note that the cross entropy is the logarithm of the probability of each cell above. A cursory examination of the table would seem to indicate that the correct decision would be that the target tracked by Cloud 6 disappeared since Cloud 6 makes a very small contribution to the overall probability for Target 5, or indeed to any other target.

For the column Maxima, the table shows the cross entropies between known targets and existing particle clouds. The lower half shows the column maxima of the cross entropies and where they occur. Cloud 6 has no matching target which means that the target has probably disappeared. At block 809, there is a determination if the last frame in a finite sequence of images has occurred if so then the process ends if not, then the process returns to block 803.

In some instances, when cells merge it is not because they have physically merged but that the software, namely the INCELL™ Developer toolbox software program manufactured by GE Healthcare in Piscataway, N.J., cannot distinguish two cells because they are close together. In this case it may be possible to optionally employ a tracker or software to discern that there are in fact two cells and to segment them.

This invention provides an automated system and method that allows a user to track the movement of an object, such as at least one cell amongst a plurality of cells as it moves from one point to another over time in order for the user to determine how the at least one cell functions. The user is able to track the movement of the at least one cell and determine if the at least one cell structure has changed, such as the at least one cell experiencing cell division or if two or more cells merge together. This user is able to optimally track the at least one cell to find an approximate location of at least one the cell as it moves in time and distance. Thus, this invention provides the user with a means to track cell movement to study cell function.

Although the present invention has been described above in terms of specific embodiments, many modification and variations of this invention can be made as will be obvious to those skilled in the art, without departing from its spirit and scope as set forth in the following claims.

What is claimed is:

1. An apparatus for tracking individual cells among a plurality of cells from a previous image frame to a current image frame, comprising:
   an image receiving device configured to:
      receive said current and previous image frames;
      identify observable characteristics including location, intensity, and label for individual cells in the previous frame;
      identify observable characteristics including location, intensity, and label for individual cells in the current frame; and
      identify events linking individual cells in the current frame to individual cells in the previous frame based on the observable characteristics identified for individual cells in respective frame;
   wherein identification of events comprises a particle filter algorithm with an inner layer and an outer layer;
   each component of the inner layer comprises a cloud of particles configured to pursue an individual cell from the previous frame at a location to the current frame at a next location;
   the outer layer comprising:
      determining, for each cloud of particles of the inner layer, a distance to each cell in the current frame; and
      identifying events from said distances.

2. The apparatus of claim 1, wherein the events comprise: cell arrival, cell departure, cell division and cell merging; and none.

3. The apparatus of claim 1, wherein the image receiving device is further configured to:
   label individual cells in the current frame based on the linking events and the labels of the cells in the previous frame.

4. The apparatus of claim 1, wherein the inner layer includes a probability density function to determine the approximate location of the individual cells in the current frame.

5. The apparatus of claim 4, wherein the probability density function is a thick tailed density function, such as a Hyperbolic Cauchy Density.

6. The apparatus of claim 1, wherein the outer layer comprises building a responsibility matrix of said determined distances for identifying events.

7. The apparatus of claim 1, wherein the distance to each cell in the current frame ($d_{jk}$) is calculated by:

$$d_{jk} = -\sum_{i=1}^{N} \log w_{ijk}$$

where $w_{ijk}$ is the probability density function of each cell's position in feature space relative to a given particle.

8. The method of claim 1, wherein the distance to each cell in the current frame ($d_{jk}$) is estimated as the cross entropy.

9. The apparatus of claim 8, wherein the particles in the particle cloud are drawn from a density p(x) and the distance $d_{jk}$ between particles that comprise a cloud is estimated by:

$$d_{jk} \approx -\int p(x) \log w(x) dx.$$

10. The apparatus of claim 1, wherein events are identified utilizing Bayesian Decision Theory or Bayesian Network Theory.

* * * * *